United States Patent
Katagiri

(10) Patent No.: US 7,226,138 B2
(45) Date of Patent: Jun. 5, 2007

(54) DRAWER

(75) Inventor: Katsuhiro Katagiri, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 394 days.

(21) Appl. No.: 10/878,412

(22) Filed: Jun. 29, 2004

(65) Prior Publication Data

US 2005/0017611 A1   Jan. 27, 2005

(30) Foreign Application Priority Data

Jul. 22, 2003   (JP) .............................. 2003-277777

(51) Int. Cl.
 *A47B 88/00* (2006.01)
(52) U.S. Cl. ..................... 312/319.1; 108/45
(58) Field of Classification Search ............. 312/319.1, 312/330.1, 242, 246, 9.19, 9.22, 9.24, 9.57, 312/319.5–319.8; 108/45, 44; 224/483, 224/281, 926; 248/311.2
See application file for complete search history.

(56) References Cited

U.S. PATENT DOCUMENTS

| | | | | |
|---|---|---|---|---|
| 1,778,857 A | * | 10/1930 | James | 109/47 |
| 3,337,282 A | * | 8/1967 | Groff et al. | 312/245 |
| 4,705,166 A | * | 11/1987 | Ackeret | 206/308.1 |
| 4,792,174 A | * | 12/1988 | Shioda | 296/37.12 |
| 5,052,728 A | * | 10/1991 | Fukumoto | 292/106 |
| 5,135,294 A | * | 8/1992 | Ohshima et al. | 312/319.1 |
| 5,199,777 A | * | 4/1993 | Taima et al. | 312/319.1 |
| 5,228,611 A | * | 7/1993 | Yabuya | 224/281 |
| 5,765,736 A | * | 6/1998 | Fischer et al. | 224/281 |
| 6,510,051 B2 | * | 1/2003 | Kim | 361/686 |
| 7,032,985 B1 | * | 4/2006 | Ichioka et al. | 312/319.2 |
| 7,035,109 B2 | * | 4/2006 | Nishio et al. | 361/724 |
| 2005/0269919 A1 | * | 12/2005 | Sambommatsu et al. | 312/319.5 |

FOREIGN PATENT DOCUMENTS

| | | | |
|---|---|---|---|
| JP | A-5-56602 | | 7/1993 |
| JP | A-7-27943 | | 5/1995 |
| JP | A-7-291013 | | 7/1995 |
| JP | 2006-82769 | * | 3/2006 |

* cited by examiner

*Primary Examiner*—Janet M. Wilkens
(74) *Attorney, Agent, or Firm*—Posz Law Group, PLC

(57) ABSTRACT

A drawer includes a case, a drawer member, a switching member, and an urging-direction changing member. The case is buried in a panel. The drawer member is drawable out of the case, and is accommodatable in the case. The switching member is capable of outputting an operation force applied thereto in a forward direction and in a reverse direction in a switching manner. The urging-direction changing member receives outputs from the switching member, and is capable of urging the drawer member in a drawn-out direction and in an accommodated direction in a changing manner. The drawer can urge the drawer member in both directions, the drawn-out direction and the accommodated direction, with a reduced number of component parts and with high reliability.

3 Claims, 4 Drawing Sheets

DRAWER

BACKGROUND OF THE INVENTION

1. Field of the Invention

The present invention relates to a drawer which is disposed in instrument panels within vehicle passenger rooms, for example, and which is used as a cup holder, an ashtray or a change box.

2. Description of the Related Art

Japanese Unexamined Utility Model Publication (KOKAI) No. 7-27,943 discloses a cup holder which is equipped with a case and a holder body. The holder body can be drawn out of and can be accommodated in the case. Moreover, the holder body is always urged by a spring in the drawn-out direction. Therefore, the holder body can be drawn out of the case automatically. Japanese Unexamined Utility Model Publication (KOKAI) No. 5-56,602 discloses an ashtray which is provided with a case and an ashtray body. In the ashtray as well, the ashtray body is always urged in the drawn-out direction similarly to the cup holder disclosed in Japanese Unexamined Utility Model Publication (KOKAI) No. 7-27,943. Japanese Unexamined Patent Publication (KOKAI) No. 7-291,013 discloses a cup holder which is equipped with a case and a holder body. Also in the cup holder, the holder body is always urged in the drawn-out direction in the same manner as the cup holder disclosed in Japanese Unexamined Utility Model Publication (KOKAI) No. 7-27,943.

In the case of the cup holders and ashtray disclosed in the publications, the holder bodies and ashtray body are always urged in the drawn-out direction. Accordingly, when accommodating the holder bodies and ashtray body in the cases, it is required for an operator to keep applying such an operation force that overcomes the urging force to the holder bodies and ashtray successively. Consequently, the cup holders and ashtray disclosed in the publications are poor in terms of the operability.

Moreover, the urging force acts always in the drawn-out direction. Accordingly, an independent member is needed in order to keep the accommodated state of the holder bodies and ashtray body. For instance, in the cup holder disclosed in Japanese Unexamined Utility Model Publication (KOKAI) No. 7-27,943, the holder body is engaged with a lock claw to keep accommodating the holder body in the case. Moreover, in the ashtray disclosed in Japanese Unexamined Utility Model Publication (KOKAI) No. 5-56,602 and the cup holder disclosed in Japanese Unexamined Patent Publication (KOKAI) No. 7-291,013, the ashtray body and holder body are engaged with a heart-shaped cam to maintain the accommodated state of the astray body and holder body in the case. Thus, the cup holders and ashtray disclosed in the publications comprise a large number of component parts, and the structures are complicated.

SUMMARY OF THE INVENTION

The present invention has been developed and completed in view of such circumstances. It is therefore an object of the present invention to provide a drawer which can urge a drawer member in both directions, the drawn-out direction and the accommodated direction.

A drawer according to the present invention can solve the aforementioned problems, and comprises:

a case buried in a panel;

a drawer member being drawable out of the case, and being accommodatable in the case;

a switching member being capable of outputting an operation force applied thereto in a forward direction and in a reverse direction in a switching manner; and an urging-direction changing member receiving outputs from the switching member, and being capable of urging the drawer member in a drawn-out direction and in an accommodated direction in a changing manner.

According to a second aspect of the present invention, it is preferable to arrange the present drawer so that it can further comprise:

a driving gear for driving the drawer member; and the urging-direction changing member can be a turnover spring receiving the outputs from the switching member, and being capable of urging the driving gear in a forward direction and in a reverse direction in a changing manner, whereby:

the switching member outputs the operation force in the forward direction to let the turnover spring urge the driving gear in the forward direction so that the driving gear draws the drawer member out of the case when urging the drawer member in the drawn-out direction; and the switching member outputs the operation force in the reverse direction to let the turnover spring urge the driving gear in the reverse direction so that the driving gear accommodates the drawer member in the case when urging the drawer member in the accommodated direction.

Moreover, according to a third aspect of the present invention, it is furthermore preferable to arrange the present drawer according to the second aspect of the present invention so that the switching member can be a swinging switch comprising a forward-direction input unit and a reverse-direction input unit, swinging in the forward direction when the operation force is input to the forward-direction input unit, and swinging in the reverse direction when the operation force is input to the reverse-direction input unit; and the turnover spring can be disposed between the swinging switch and the case, can receive swinging forces output from the swinging switch, and can be capable of urging the driving gear in the forward direction and in the reverse direction in a changing manner.

The present drawer can urge the drawer member in both directions, the drawn-out direction and the accommodated direction, in a changing manner. Accordingly, the present drawer is good in terms of the operability. Moreover, in the present drawer, the urging-direction changing member can maintain each of the drawn-out state and accommodated state of the drawer member. Consequently, in the present drawer, it is possible to obviate independent members for keeping the accommodated state of the drawer member, such as the lock claw and the heart-shaped cams disclosed in Japanese Unexamined Utility Model Publication (KOKAI) No. 7-27,943, Japanese Unexamined Utility Model Publication (KOKAI) No. 5-56,602 and Japanese Unexamined Patent Publication (KOKAI) No. 7-291,013. Therefore, the present drawer comprises a less number of component parts, and has a simplified construction. In addition, when the turnover spring is used as the urging-direction changing member as set forth in the second aspect of the present invention, it is possible to dispose the urging-direction changing member less expensively and readily comparatively. Still further, when the swinging switch is used as the switching member as set forth in the third aspect of the present invention, it is possible to reverse the urging direction of the turnover spring, which urges the driving gear, from forward to reverse or vice versa with ease relatively.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for the purpose of illustration only and not intended to limit the scope of the appended claims.

EXAMPLE

Hereinafter, the present invention will be described with reference to a form of embodying the present drawer as a drawable cup holder for vehicles.

Figure 1:
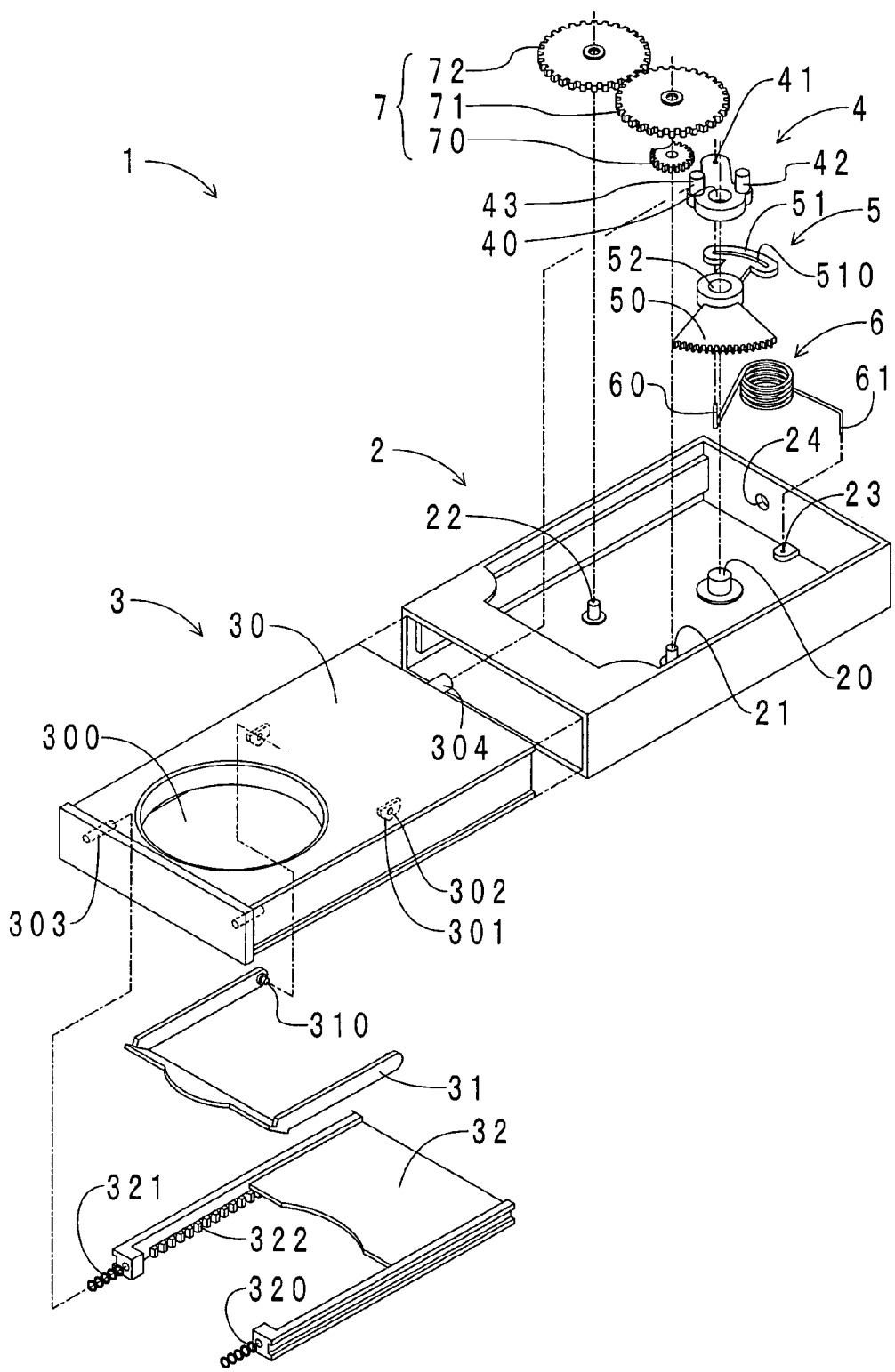
FIG. 1 is an exploded view of a cup holder according to an example of the present invention.
Figure 2:
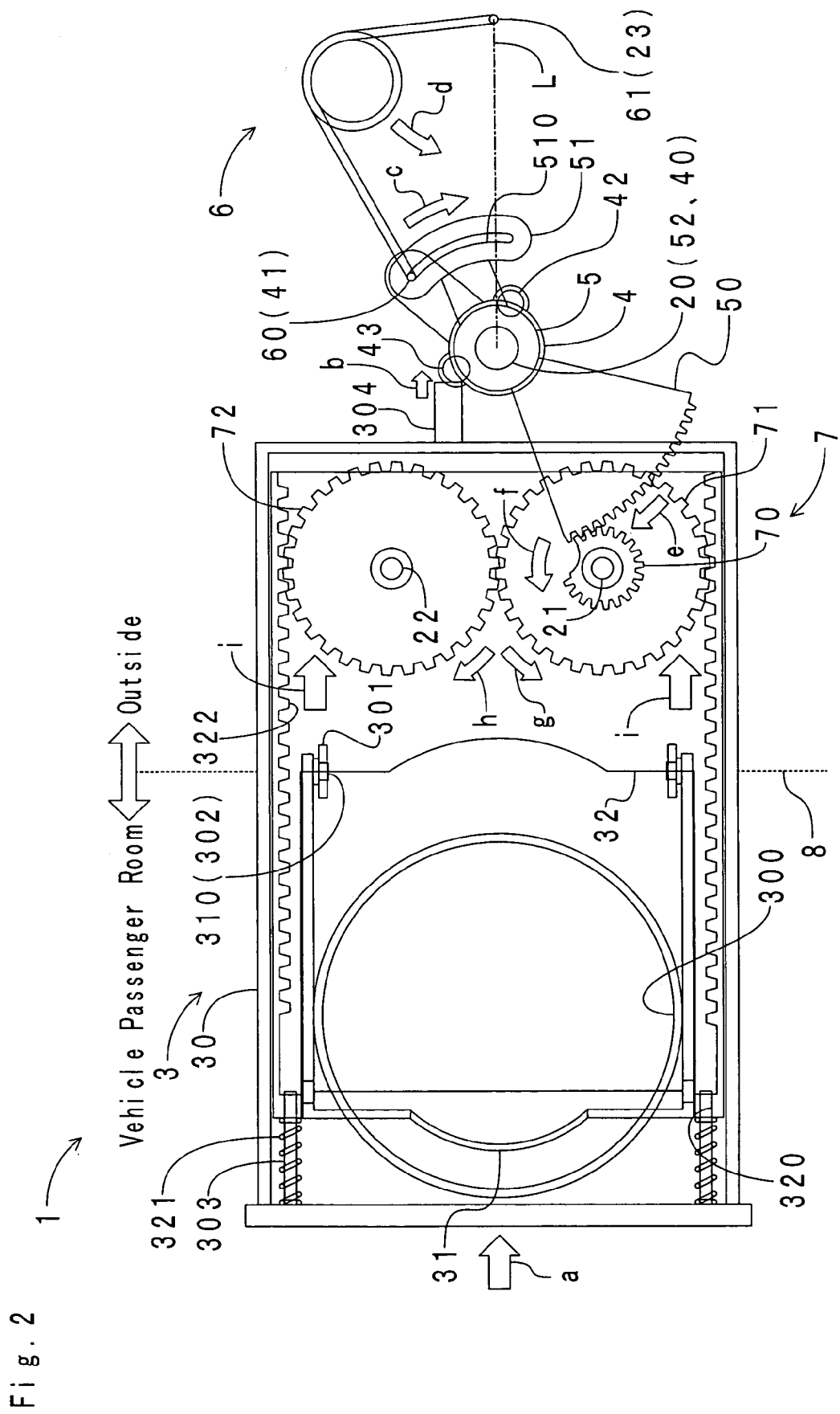
FIG. 2 is an overhead perspective view of the cup holder when it is drawn out.
Figure 3:
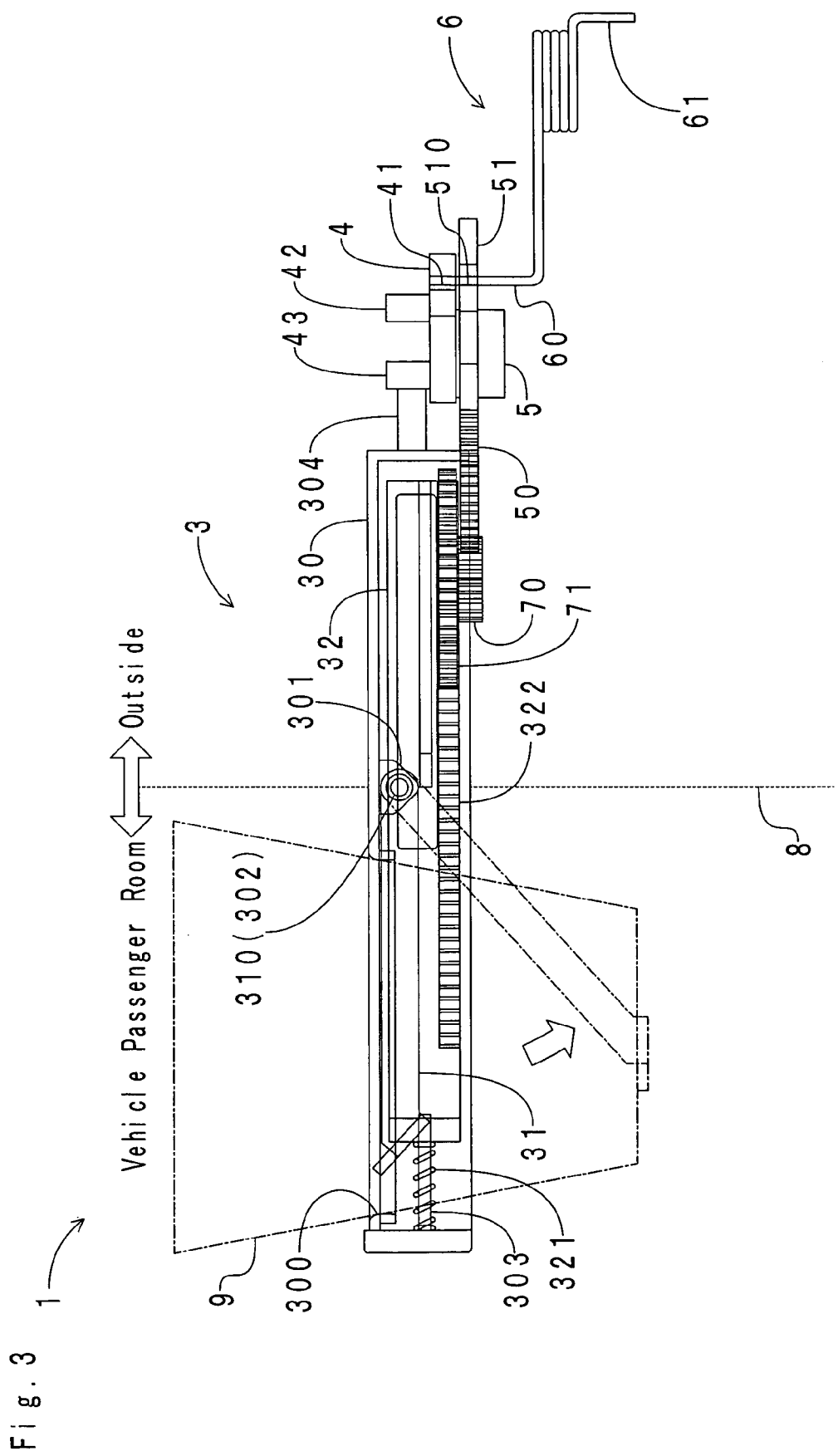
FIG. 3 is a sideward perspective view of the cup holder when it is drawn out.

First, the arrangement of a cup holder according to an example of the present invention will be hereinafter described in detail. FIG. 1 illustrates an exploded view of the cup holder. FIG. 2 illustrates an overhead perspective view of the cup holder when it is drawn out. FIG. 3 illustrates a sideward perspective view of the cup holder when it is drawn out. Note that FIGS. 2 and 3 illustrate the cup holder without showing the case.

As illustrated in the drawings, a cup holder 1 comprises a case 2, a holder body 3, a swinging switch 4, a driving gear 5, a turnover spring 6, and gears 7. Note that the present drawer includes the cup holder 1. Moreover, the drawer member of the present drawer includes the holder body 3.

The case 2 is made of resin, and is formed as a rectangular parallelepiped box shape which opens inward with respect to a vehicle passenger room as well as upward. As illustrated in FIGS. 2 and 3, the case 2 is buried in an instrument panel 8. The panel of the present drawer includes the instrument panel 8. As shown in FIG. 1, a driving-gear swinging projection 20, a first-gear swinging shaft 21 and a second-gear swinging shaft 22 protrude from the inner bottom-wall surface of the case 2, and are disposed at predetermined intervals thereon separately. Moreover, a spring swinging hole 23 is bored at the outward end with respect to the vehicle passenger room in the inner bottom-wall surface of the case 2. In addition, an output projection accommodating hole 24 is bored in the outward end-wall of the case 2 with respect to the vehicle passenger room.

As illustrated in FIG. 1, the cup holder 3 comprises a cup body holder 30, a cup bottom holder 31, and a driven member 32. The a cup body holder 30 is made of resin, and is formed as a rectangular parallelepiped box shape which opens downward. The cup body holder 30 is disposed so that it can be drawn from and accommodated in the case 2 inward and outward with respect to the vehicle passenger room. A circular holding hole 300 is opened in the top wall of the cup body holder 30. Moreover, a supporting tab 301 projects from the inner top-wall surface of the cup body holder 30. A bottom-supporter swinging hole 302 is bored in the supporting tab 301. Note that the cup body holder 30 is equipped with two supporting tabs 301 in total, supporting tabs 301 which are disposed at a predetermined interval separately in the vehicle widthwise direction. Moreover, a coil-spring supporting projection 303 protrudes from the inner end-wall surface of the cup body holder 30, inner end-wall surface which is disposed inward on the side of the vehicle passenger room. Note that the cup body holder 30 is equipped with two coil-spring supporting projections 303 in total, coil-spring supporting projections 303 which are disposed at a predetermined interval separately in the vehicle widthwise direction. In addition, a reverse-direction output projection 304 projects from the outer end-wall surface of the cup body holder 30, outer end-wall surface which is disposed outward with respect to the vehicle passenger room. In a later-described accommodated state, the reverse-direction output projection 304 is accommodated in the output projection accommodating hole 24 of the case 2.

The cup bottom supporter 31 is made of resin, and is formed as a letter "C" shape which opens outward with respect to the vehicle passenger room. A cup-bottom supporter swinging shaft 310 projects from the facing opposite ends of the letter "C"-shaped cup bottom supporter 31, respectively. The cup-bottom supporter swinging shafts 310 are fitted into the bottom-supporter swinging holes 302 of the supporting tabs 301 in the cup body holder 30. Thus, the cup bottom supporter 31 can swing about the cup-bottom supporter swinging shafts 310. Moreover, as illustrated with the chain line in FIG. 3, the cup bottom supporter 31 is developed downward from the cup body holder 30. Thus, the cup body holder 30 and the cup bottom supporter 31 support cups such as a paper cup 9.

As illustrated in FIG. 1, the driven member 32 is made of resin, and is formed as a letter "C" shape which opens inward with respect to the vehicle passenger room. The driven member 32 is accommodated in the cup body holder 30. A projection accommodating hole 320 is bored at the paired opposite ends of the letter "C"-shaped driven member 32, respectively. The coil-spring supporting projections 303 with a coil spring 321 equipped therearound are fitted into the projection accommodating holes 320. In other words, the coil springs 321 are interposed between the inner surface of the cup body holder 30 and the outer surface of the driven member 32. Moreover, paired racks 322 are formed on both inner-wall surfaces of the driven member 32 in the vehicle widthwise direction. Note that the racks 322 extend inward and outward with respect to the vehicle passenger room.

The driving gear 5 is made of resin, and comprises a gear body 50, a guide 51 and a driving-gear swinging hole 52. The gear body 50 is formed as a sector shape. The guide 51 faces the gear body 50 about the driving-gear swinging hole 52. An arc-shaped guide groove 510 is formed in the guide 51. The driving-gear swinging projection 20 of the case 2 is fitted into the driving-gear swinging hole 52. Thus, the driving gear 5 can swing about the driving-gear swinging projection 20. Note that the center of the curvature of the gear body 50 and arc-shaped guide groove 510 coincides with the central axis of the driving-gear swinging projection 20.

The swinging switch 4 is made of resin, and is formed as a fine plate shape. A switch swinging hole 40 is bored at one of the longitudinal opposite ends of the swinging switch 4. The driving-gear swinging projection 20, which penetrates through the driving-gear swinging hole 52 of the driving gear 5, is fitted into the switch swinging hole 40. Thus, the swinging switch 4 is disposed above the driving gear 5. Moreover, the swinging switch 4 can swing about the driving-gear swinging shaft 20 in the same manner as the driving gear 5. On the other hand, a spring engaging hole 41 is bored at the other one of the longitudinal opposite ends of the swinging switch 4. Moreover, a forward-direction input projection 42 and a reverse-direction input projection 43 are disposed adjacent to the switch swinging hole 40 separately by a predetermined angle, and project upward. The forward-direction input unit of the present drawer includes the forward-direction input projection 42. The reverse-direction input unit of the present drawer includes the reverse-direction input projection 43. As illustrated in FIG. 2, the reverse-direction output projection 304 contacts with the reverse-direction input projection 43 in the drawn-out state.

As illustrated in FIG. 1, an opposite end 60 of the turnover spring 6 is fitted into the spring engaging hole 41 of the swinging switch 4 after it penetrates through the arc-shaped guide groove 510 of the driving gear 5 upward from down below. On the other hand, the other opposite end 61 of the turnover spring 6 is fitted into the spring swinging hole 23 of the case 2. Thus, the turnover spring 6 can swing about the other opposite end 61.

As illustrated in FIG. 1, the gears 7 comprise a minor gear 70, a first major gear 71, and a second major gear 72. The minor gear 70 is made of resin, and is formed as a disk shape. The first major gear 71 is made of resin, and is formed as a disk shape whose diameter is larger than that of the minor gear 70. The first major gear 71 disposed on the minor gear 70 coaxially therewith. Moreover, the minor gear 70 and the first major gear 71 are formed integrally, but are shown in a disassembled manner in FIG. 1 for the convenience of description. The minor gear 70 and first major gear 71 are held swingably to the first-gear swinging shaft 21 of the case 2. The minor gear 70 meshes with the gear body 50 of the driving gear 5. Moreover, the first major gear 71 meshes with the rack 322, one of the paired racks 322.

The second major gear 72 is made of resin, and is formed as a disk shape whose diameter is identical with that of the first major gear 71. The second major gear 72 is disposed parallely on the side of the first major gear 71. The second major gear 72 is held swingably to the second-gear swinging shaft 22 of the case 2. The second major gear 72 meshes with the rack 322, the other one of the paired racks 322, which does not mesh with the first major gear 71. Moreover, the second major gear 72 meshes with the first major gear 71.

Figure 4:
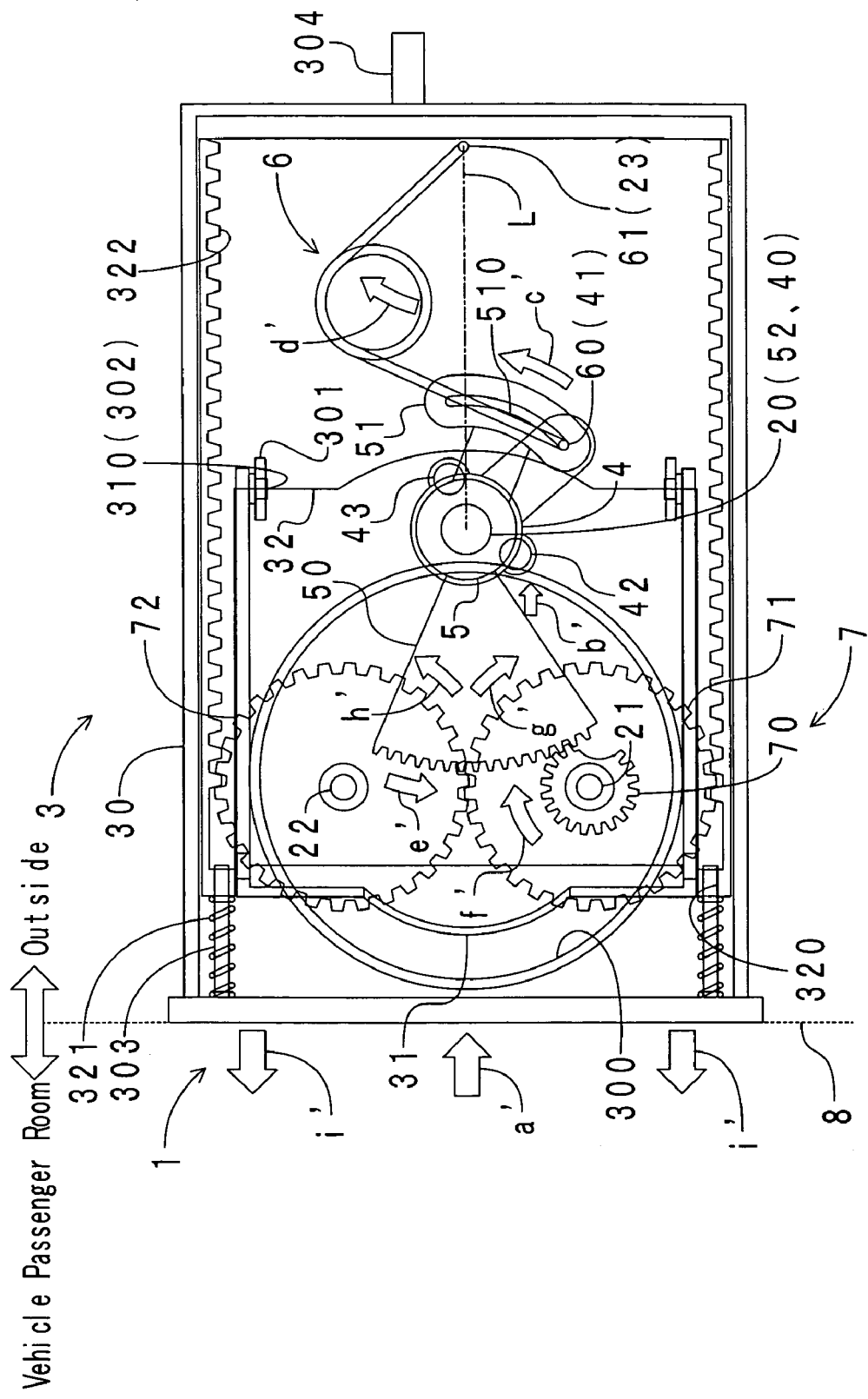
FIG. 4 is an overhead perspective view of the cup holder when it is accommodated.

Next, the operations of the cup holder 1 according to the example of the present invention will be hereinafter described. FIG. 4 illustrates an overhead perspective view of the cup holder 1 when it is accommodated. Note that the drawing illustrates the cup holder 1 without showing the case 2. First, the operations of the cup holder 1 will be described when it is changed from the drawn-out state to the accommodated state. Turning now back to FIG. 2, when an operator pushes the end wall of the cup body holder 30, disposed inward on the side of the vehicle passenger room, in the direction of the arrow "a," the entire cup body holder 30 moves in the direction of the arrow "a" against the urging force of the coil springs 321. Accordingly, the reverse-direction output projection 304 moves in the direction of the arrow "b" as well. In the drawn-out state, the reverse-direction input projection 43 of the swinging switch 4 contacts with the reverse-direction output projection 304. Consequently, the reverse-direction output projection 304 presses the swinging switch 4, and the swinging switch 4 swings in the direction of the arrow "c." Note that the opposite end 60 of the turnover spring 6 is fitted into the spring engaging hole 41 of the swinging switch 4 as illustrated in FIG. 3. Accordingly, together with the swinging switch 4, the opposite end 60 swings within the arc-shaped guide groove 510 in the direction of the arrow "c." Incidentally, the urging force of the turnover spring 6 acts in the opposite direction with respect to the arrow "c" until the opposite end 60 goes beyond a reverse line "L" at which the interval between the opposite end 60 and the other opposite end 61 is minimum. Consequently, the operator keeps the opposite end 60 swinging within the arc-shaped guide groove 510 in the direction of the arrow "d" against the urging forces of the turnover spring 6 and coil springs 321 until the opposite end 60 goes beyond the reverse line "L." When the opposite end 60 goes beyond the reverse line "L," the urging direction of the turnover spring 6 changes. Specifically, the urging force of the turnover spring 6 comes to act in the direction of the arrow "c." Accordingly, the operator does not have to apply the operation force to the cup body holder 30. The urging force of the turnover spring 6 lets the opposite end 60 contact with a trailing end of the arc-shaped guide groove 510 in the direction of the arrow "c." The pressing force of the opposite end 60 is transmitted to the driving gear 5 by way of the trailing end of the arc-shaped guide groove 510 in the direction of the arrow "c." Consequently, the driving gear 5 swings in the direction of the arrow "e." Here, note that the gear body 50 of the driving gear 5 meshes with the minor gear 70. Therefore, the minor gear 70 swings in the direction of the arrow "f." Moreover, note that the first major gear 71 is formed integrally with the minor gear 70. Consequently, the first major gear 71 swings in the direction of the arrow "g." Note that the first major gear 71 meshes with the second major gear 72. Therefore, the second major gear 72 swings in the direction of the arrow "h." Moreover, the first major gear 71 meshes with the rack 322 one of the paired racks 322 of the driven member 32. In addition, the second major gear 72 meshes with the rack 322, the other one of the paired racks 322 of the driven member 32. Therefore, the driven member 32 moves in the direction of the arrow "i." When the driven member 32 thus moves, the case 2 regulates the cup bottom holder 31 at the bottom periphery of the opening of the case 2 (see FIG. 1) to fold the cup bottom holder 31 into the cup body holder 30. Under the circumstance, the entire holder body 3 is accommodated in the case 2, and the reverse-direction output projection 304 of the cup body holder 30 is fitted into the output projection accommodating hole 24 of the case 2. Thus, the cup holder 1 is changed from the drawn-out state to the accommodated state shown in FIG. 4.

Subsequently, the operations of the cup holder 1 will be hereinafter described when it is changed from the accommodated state to the drawn-out state. Turning now to FIG. 4, when an operator pushes the end wall of the cup body holder 30, disposed inward on the side of the vehicle passenger room, in the direction of the arrow "a'," the entire cup body holder 30 moves in the direction of the arrow "a'" against the urging force of the coil springs 321. Accordingly, the periphery of the supporting hole 300 moves in the direction of the arrow "b'" as well. In the accommodated state, the forward-direction input projection 42 of the swinging switch 4 contacts with the periphery of the supporting hole 300. Consequently, the periphery of the supporting hole 300 presses the swinging switch 4, and the swinging switch 4 swings in the direction of the arrow "c'." Specifically, when the cup holder 1 is changed from the accommodated state to the drawn-out state, the periphery of the supporting hole 300 functions in the same manner as the reverse-direction output projection 304. The swinging switch 4 and the end 60 of the turnover spring 6 move within the arc-shaped guide groove 510 in the direction of the arrow "c'." Thus, the operator keeps the end 60 swinging within the arc-shaped guide groove 510 in the direction of the arrow "d'" against the urging forces of the turnover spring 6 and coil springs 321 until the opposite end 60 goes beyond the reverse line "L." When the opposite end 60 goes beyond the reverse line "L," the urging direction of the turnover spring 6 changes. Specifically, the urging force of the turnover spring 6 comes to act in the direction of the arrow "c'." Accordingly, the operator does not have to apply the operation force to the cup body holder 30. The urging force of the turnover spring 6 lets the opposite end 60 contact with a trailing end of the arc-shaped guide groove 510 in the direction of the arrow "c'." The pressing force of the opposite end 60 is transmitted to the driving gear 5 by way of the trailing end of the arc-shaped guide groove 510 in the direction of the arrow "c'." Consequently, the driving gear 5 swings in the direction of the arrow "e'." When the driving gear 5 thus swings, the minor gear 70 swings in the direction of the arrow "f'." Moreover, the first major gear 71 swings in the direction of the arrow "g'." The second major gear 72, which meshes with the first major gear 71, swings in the direction of the arrow "h'." Accordingly, the paired racks 322, which mesh with the first major gear 71 and second major gear 72, act to move the driving member 32 in the direction of the arrow "i'." When the driven member 32 thus moves, the cup bottom holder 31 develops downward out of the cup body holder 30 while being regulated by the bottom periphery of the opening of the case 2 (see FIG. 1). Thus, the cup holder 1 is changed from the accommodated state to the drawn-out state shown in FIG. 2.

Then, the advantages of the cup holder 1 according to the present example will be hereinafter described. The cup holder 1 can urge the holder body 3 in both directions, the drawn-out direction and the accommodated direction, in a changing manner. Namely, if only an operator applies an operation force to the holder body 3 until the opposite end 60 of the turnover spring 6 goes beyond the reverse lines "L" shown in FIGS. 2 and 4, the holder body 3 moves in the accommodated direction or the drawn-out direction automatically thereafter. Therefore, the cup holder 1 offers the operator good operability.

Further, the cup holder 1 according to the present example can maintain the drawn-out state and the accommodated state by the urging force of the turnover spring 6, respectively. Accordingly, the cup holder 1 can obviate the lock claw and the heart-shaped cams disclosed in Japanese Unexamined Utility Model Publication (KOKAI) No. 7-27,943, Japanese Unexamined Utility Model Publication (KOKAI) No. 5-56,602 and Japanese Unexamined Patent Publication (KOKAI) No. 7-291,013. Therefore, the cup holder 1 comprises a less number of component parts, and has a simplified construction.

Furthermore, the cup holder 1 according to the present example uses the turnover spring 6 as the urging-direction changing member. Accordingly, the cup holder 1 can be manufactured at reduced cost. Moreover, the cup holder 1 uses the swinging switch 4 as the switching member. Consequently, the cup holder 1 can reverse the urging direction of the turnover spring 6, which urges the driving gear 5, from forward to reverse or vice versa with ease relatively.

In addition, in the cup holder 1 according to the present example, the coil springs 321 are interposed between the inner surface of the cup body holder 30 and the outer surface of the driven member 32. Accordingly, when an operator operates the cup holder 1, he or she needs to reverse the urging direction of the turnover spring 6 from forward to reverse or vice versa against the urging forces of the turnover spring 6 and coil springs 321. Therefore, the cup holder 1 is less likely to malfunction. Still further, the cup holder 1 exhibits maintainability over the accommodated state and the drawn-out state. Still furthermore, when an operator operates the cup holder 1, the cup holder 1 folds the cup bottom holder 31 into the cup body holder 30 or develops the cup bottom holder 31 out of the cup body holder 30 automatically. In view of this, the cup holder 1 is good in terms of the operability.

Still moreover, when the cup holder 1 of the present example is changed from the accommodation state to the drawn-out state, the periphery of the supporting hole 300 functions in the same manner as the reverse-direction output projection 304 in the instance of being changed from the drawn-out state to the accommodated state. Accordingly, it is unnecessary to dispose a forward-direction output projection additionally and independently. In view of this, the cup holder 1 can comprise with a minimum number of component parts only.

MODIFIED VERSIONS

Heretofore, one of the embodiment modes of the present drawer is described. However, the embodiment modes are not limited to the above-described embodiment mode particularly. It is possible to perform the present drawer in various modified embodiment modes or improved embodiment modes which one of ordinary skill in the art can carry out.

For example, in the above-described example, the present invention is embodied as a cup holder. However, the present invention can be embodied as ashtrays or change boxes. Moreover, in the example, the racks 322 are disposed on the holder body 3 (i.e., the movable side); and the gears 7 are disposed on the case 2 (i.e., the stationary side), respectively. However, the racks 322 and the gears 7 can be disposed reversely.

Moreover, the stationary-side members, such as the swinging switch 4, the driving gear 5, the turnover spring 6 and the gears 7 in the case of the example, can be disposed on parts other than the case 2. In addition, in the example, the instrument panel 8 and the case 2 are manufactured independently, but both members can be integral.

Having now fully described the present invention, it will be apparent to one of ordinary skill in the art that many changes and modifications can be made thereto without departing from the spirit or scope of the present invention as set forth herein including the appended claims.

What is claimed is:

1. A drawer, comprising:
   a case installed in a panel;
   a drawer member being drawable out of the case, and being accommodatable in the case;
   a switching member being capable of outputting an operation force applied thereto in a forward direction and in a reverse direction in a switching manner; and
   an urging-direction changing member receiving outputs from the switching member, the urging-direction changing member being capable of urging the drawer member in a drawn-out direction and in an accommodated direction in a changing manner; and a driving gear for driving the drawer member; wherein
the urging-direction changing member is a turnover spring receiving the outputs from the switching member, the urging-direction changing member being capable of urging the driving gear in a forward direction and in a reverse direction in a changing manner;

the switching member outputs the operation force in the forward direction to let the turnover spring urge the driving gear in the forward direction so that the driving gear draws the drawer member out of the case when urging the drawer member in the drawn-out direction;

the switching member outputs the operation force in the reverse direction to let the turnover spring urge the driving gear in the reverse direction so that the driving gear accommodates the drawer member in the case when urging the drawer member in the accommodated direction;

the switching member is a swinging switch comprising a forward-direction input unit and a reverse-direction input unit, swinging in the forward direction when the operation force is input to the forward-direction input unit, and swinging in the reverse direction when the operation force is input to the reverse-direction input unit; and the turnover spring is disposed between the swinging switch and the case, receives swinging forces output from the swinging switch, and is capable of urging the driving gear in the forward direction and in the reverse direction in a changing manner.

2. The drawer set forth in claim 1 further comprising an urging member for further urging the drawer member, whereby the urging-direction changing member urges the drawer member in the drawn-out direction and in the accommodated direction in a changing manner when the operation force overcomes the resultant force of the urging force of the urging-direction changing member and the urging force of the urging member.

3. The drawer set forth in claim 2, wherein said urging member is disposed between the case and the drawer member.

* * * * *